United States Patent [19]

Dyck

[11] 4,386,671

[45] Jun. 7, 1983

[54] TORQUE ARM MOUNTING FOR WEIGH SCALE

[76] Inventor: George Dyck, 1306-13th St., Saskatoon, Saskatchewan, Canada

[21] Appl. No.: 306,721

[22] Filed: Sep. 29, 1981

[30] Foreign Application Priority Data

Jul. 10, 1981 [CA] Canada .................................. 381493

[51] Int. Cl.³ ...................... G01G 5/04; G01G 19/02; G01G 21/12
[52] U.S. Cl. .................................... 177/208; 177/134; 177/254; 177/255; 177/DIG. 9
[58] Field of Search ................................ 177/133–135, 177/208, 254, 255, DIG. 8, DIG. 9

[56] References Cited

U.S. PATENT DOCUMENTS

| | | | |
|---|---|---|---|
| 2,736,549 | 2/1956 | Paul | 177/133 X |
| 3,354,973 | 11/1967 | Farquhar | 177/255 X |
| 3,658,143 | 4/1972 | Schwartz | 177/255 X |
| 4,064,955 | 12/1977 | Dyck | 177/DIG. 9 |
| 4,189,018 | 2/1980 | Brouwer | 177/DIG. 9 |
| 4,261,428 | 4/1981 | Bradley | 177/255 X |

Primary Examiner—George H. Miller, Jr.
Attorney, Agent, or Firm—Birch, Stewart, Kolasch & Birch

[57] ABSTRACT

A novel internally pivoted torque arm mounting device for weigh-in-motion or for static weigh scales is provided herein. It includes at least four internally pivoted torque-transmitting tubular arms arranged around the perimeter of the fixed bed for the load-supporting platform. One portion of each of the torque-transmitting tubular arms is supported with respect to a fixed peripheral frame base structure of the fixed bed, and another portion of each of the torque-transmitting tubular arms is supported in guideways with respect to a central load-supporting platform of the fixed bed. The improved mounting for the torque arm includes a pair of spaced-apart, vertically disposed inner and outer guideways extending along chords of the end of the torque-transmitting tubular arms. A horizontally-extending, hardened wear surface intersects the guideways, to divide each inner and outer guideway into an upper and a lower guideway. Four support shoes are provided, namely an inner upper and an inner lower support shoe as well as an outer upper and an outer lower support shoe. Each such shoe except for only one of the inner shoes has a broad arcuate support surface and each has a narrow arcuate support surface. Each of the four shoes is disposed in an associated guideway and the narrow arcuate support surface bears against the hardened wear surface. The broad arcuate support surfaces bear against respective upper and lower wear plate portions of the central load-supporting platform and of the outer fixed frame. The broad flat support surface is secured with respect to either an upper or a lower surface of the outer fixed frame. For a given weight, the torque on the torque tube member is thus reduced by a significant amount, i.e., about seventy-five percent or more. This significantly reduces its weight, its cost of production and its cost of operation.

22 Claims, 5 Drawing Figures

TORQUE ARM MOUNTING FOR WEIGH SCALE

BACKGROUND OF THE INVENTION (i) Field of the Invention

This invention relates to components for weighing scales and more particularly to torque arm mounting means for such weighing scales. More specifically, it relates to internally pivoted torque-transmitting arms for weigh-in-motion or for static weigh scales.

(ii) Description of the Prior Art

Presently available weighing scales generally include a fixed peripheral framework, and a central movable platform, connected to the peripheral framework and to a load cell which could translate vertical movement of the central movable platform with respect to the peripheral framework into a measure of the weight on the platform.

Present weigh scales with single load cells, especially those for weighing vehicles in motion, require torque-transmitting arms with exceptional rigidity. This is so because the pivot points of the pad and roller placed outside the torque-transmitting arms were designed to be massive and heavy. Weigh-in-motion scales requiring weight measurements of ten thousand pounds or more carried stabilizing torque-transmitting arms where the pivot point of the arms was in the range of seven and one-quarter inches apart. For this reason, torque arms were designed with six inch diameter seamless tubing and a three-quarter inch wall. Also, prior art weigh scales, being of welded construction, required too much skill and judgment during assembly. The heavy torque arms, weighing as much as one hundred and eighty-five pounds each, required extra lifting equipment during installation.

One important fact to consider in the design of such weigh scales is the response time, especially when the scale is to be used for weighing vehicles in motion, but is also important for weighing vehicles or other articles when at rest. Factors which contribute to response time of such a weigh scale include: deflections of the load platform under loading due to lack of rigidity of the platform-supporting structure, friction in the interconnections linking the load platform and base structure, and vertical travel of the load platform for activating the load cell. Improved response time for vehicle scales is difficult to achieve since improvements in rigidity necessary for rapid response tend to result in increased friction which shows response.

Many proposals have been made concerning platform-supporting mechanisms which were believed to provide the required rigidity. These included the use of four peripheral torque-transmitting bars in conjunction with the following interconnecting mechanisms: pin and links, rack and gear, loop strap, and chain and sprocket. However, it was found that all of these would have too much friction to be suitable for weighing moving vehicles. U.S. Pat. No. 3,354,973 issued Nov. 28, 1967 to J. C. Farquhar illustrates typical mechanisms similar in principle to some of those previously evaluated.

An improvement thereon was provided by Dyck in U.S. Pat. No. 4,064,955 issued Dec. 27, 1977. That patent provided a scale for weighing vehicles in motion having a load-supporting platform, a fixed base structure, and means for interconnecting the platform with the base structure for allowing vertical motion of the platform. Such interconnecting means were torque-transmitting bars arranged around the perimeter of the load-supporting platform with specifically recited support and roller assemblies associated with each end of each torque-transmitting bar. A load-measuring device was also provided which operated with low vertical travel, the load cell being disposed between the platform and the base structure.

While such mounting means for the torque arms were suitable, it was found that they still did not provide adequate rigidity for all contemplated uses. Because of the intricate nature of the weigh scale, the heavy torque arms and the complicated nature of assembly, litte could be done in the field in terms of repair and adjustment. Accordingly, it is the purpose of this invention to provide an improved torque arm and scale assembly.

SUMMARY OF THE INVENTION (i) Aims of the Invention

Accordingly, it is an object of this invention to provide improved interconnecting means between the fixed peripheral framework and the movable platform of weighing scales using a plurality of torque arms to provide improved rigidity.

(ii) Statement of Invention

By a broad concept of the present invention, an internally pivoted torque arm device is provided which, for a given weight, greatly reduces the torque on the torque tube member.

This invention, then, provides an improvement in a weigh scale including a fixed peripiheral frame base structure, a central, movable load-supporting platform, and means for interconnecting the platform with the peripheral frame base structure to allow limited vertical motion of the platform, the interconnecting means comprising at least four torque-transmitting tubular arms arranged evenly around the perimeter of the load-supporting platform, with one portion of each torque-transmitting tubular arm being supported with respect to the fixed peripheral frame base structure, and another portion of each torque-transmitting tubular arm being supported with respect to the central load-supporting platform, the improved mounting for the torque-transmitting tubular arms comprising: (a) a pair of vertically disposed, spaced-apart, inner and outer guideways, extending along spaced-apart chords of the end of each torque-transmitting tubular arm; (b) a horizontally-extending, hardened wear surface intersecting the guideways, thereby providing an inner upper, an inner lower, an outer upper and an outer lower guideway; and (c) an inner upper, an inner lower, an outer upper and an outer lower support shoe operatively associated with a respective inner upper, inner lower, outer upper and outer lower guideway. Each of the inner upper and inner lower support shoes include a broad arcuate support surface and a narrow arcuate support surface, with the narrow arcuate support surface of each such support shoe bearing against the hardened wear surface, and with the broad arcuate support surface of each such support shoe bearing against respective upper and lower surface of an associated movable central load-supporting platform. Each upper outer support shoe and the lower outer support shoe include a narrow arcuate support surface, with such narrow arcuate support surface of each such support shoe bearing against the hardened wear surface, and either the outer upper support shoe or the outer lower support shoe having a broad arcuate support surface. The other of the outer upper support shoe or the outer lower support shoe includes a broad flat support surface and with the broad arcuate support surface of the outer support shoe bearing against a respective upper or lower surface of the associated fixed peripheral frame base structure, and with the broad flat support surface of the outer support shoe being secured with respect to a respective lower or upper surface of the associated fixed peripheral frame base structure.

This invention also provides a weigh scale comprising in combination: (a) a fixed rectangular peripheral frame base structure; (b) a central movable rectangular load-supporting platform; and (c) means for interconnecting the platform with the peripheral frame base structure to allow limited vertical motion of the platform. The interconnecting means comprises at least four torque-transmitting tubular arms arranged evenly around the perimeter of the load-supporting platform, with one portion of each torque-tramsmitting tubular arm being supported with respect to the fixed peripheral frame base structure, and another portion of each torque-transmitting tubular arm being supported with respect to the central load-supporting platfrom. The mounting for each torque-transmitting tubular arm comp rises: (1) a pair of vertically disposed, spaced-apart, inner and outer guideways, extending along spaced-apart chords of the end of each torque-transmitting tubular arm; (2) a horizontally-extending, hardened wear surface intersecting the guideways, thereby providing an inner upper, an inner lower, an outer upper and an outer lower guideway; (3) an inner upper, an inner lower, an outer upper and an outer lower support shoe operatively associated with a respective inner upper, inner lower, outer upper and outer lower guideway, each of the inner upper and inner lower support shoes having a broad arcuate support surface and a narrow arcuate support surface, with the narrow arcuate support surface of each such support shoe bearing against the hardened wear surface, and with the broad arcuate support surface of each such support shoe bearing against respective upper and lower surface of an associated movable central load-supporting platform, each upper outer support shoe and lower outer support shoe having a narrow arcuate support surface, with such narrow arcuate support surface of each such support shoe bearing against the hardened wear surface, and either the outer upper support shoe or the outer lower support shoe having a broad flat support surface, the other of the outer upper support shoe or the outer lower support shoe having a broad arcuate support surface and with the broad arcuate support surface of the outer support shoe bearing against a respective upper or lower surface of the associated fixed peripheral frame base structure, and with the broad flat support surface of the outer support shoe being secured with respect to a respective lower or upper surface of the associated fixed peripheral frame base structure; and (4) a load-measuring device operating with low vertical travel disposed between the platform and the base structure, the load-measuring device comprising: a sealed flat chamber, filled with load-transmitting material in the form of a non-compressible fluid or soft rubber, the lower portion thereof comprising a base, the upper portion thereof comprising a flat diaphragm, the load-measuring device including a transducer having an integral diaphragm surface thereof maintained in face-to-face contact with the flat diaphragm, the transducer being adapted to measure the increase in pressure applied to the diaphragm, thereby to provide a measure of the weight.

(iii) Other Features of the Invention

By one feature of the invention, the narrow arcuate support surface of each support shoe has an arc defined by the equation $$r = h/2$$

where r is the radius of the arc and h is the height of the shoe.

By another feature of the invention, each narrow arcuate support surface is defined by a pair of converging side walls terminating in the arcuate surface, and the arcuate surface has an arc defined by the equation $$r = h/2$$

where r is the radius of the arc and h is the height of the shoe.

By a further feature of the invention, the broad support surface of the inner upper support shoe has an arcuately curved surface, and the broad support surface of the inner lower support shoe has a flat surface.

By yet another feature of the invention, the broad arcuate support surface of the inner lower support shoe has an arcuately curved surface adapted pivotally to support the upper faces of the lower portion of the fixed peripheral frame base structure.

By yet another feature of the invention, the broad support surface of the inner upper support shoe has a flat surface, and the broad support surface of the inner lower support shoe has an arcuately curved surface.

By a still further feature of the invention, the broad flat support surface of the inner upper support shoe is fixed within a channel inset into the lower face of the upper portion of the fixed peripheral frame base structure.

By still another feature of the invention, the broad arcuate support surface of each upper inner support shoe has such arcuately curved surface adapted pivotally to support the lower faces of the upper portions of the movable central load-supporting platform.

By a further feature of the invention, the broad arcuate support surface of each upper inner support shoe is disposed within an arcuate channel inset into the lower face of the upper portion of the movable central load-supporting platform.

By yet another feature of the invention, the broad arcuate support surface of each lower inner support shoe has an arcuately curved surface adapted pivotally to support the upper faces of the lower portions of the movable central load-supporting platform.

By a further feature of the invention, the broad arcuate support surface of each lower inner support shoe is disposed within an arcuate channel inset into the upper face of the lower portion of the movable load-supporting platform.

By a still further feature of the invention, the broad arcuate support surface of each upper inner support shoe has such arcuately curved surface adapted pivotally to support the lower faces of the upper portions of the movable central load-supporting platform and the broad arcuate support surface of each lower inner support shoe has an arcuately curved surface adapted pivotally to support the upper faces of the lower portions of the movable central load-supporting platform.

By another feature of the invention, the broad arcuate support surface of the inner upper support shoe has an arcuately curved surface adapted pivotally to support the lower faces of the upper portions of the fixed peripheral frame base structure.

By still another feature of the invention, the broad arcuate support surface of the inner lower support shoe has an arcuately curved surface adapted pivotally to support the upper faces of the lower portion of the fixed peripheral frame base structure.

By another feature of the invention, the guideways and the wear surface are provided by a horizontally-extending diametrical rod secured to the end of a torque-transmitting tubular arm, the rod being provided with a pair of spaced-apart converging upper and lower channels each terminating in a flat wear surface, the channels being vertically separated by such wear surface.

By a further feature of the invention, the central longitudinal axis of the rod is offset about 0.125" below the central longitudinal axis of the torque-transmitting tubular arm.

By another feature of the invention, the guideways and the wear surface are provided by upper and lower halves defined by a pair of spaced-apart upper and lower vertically disposed bars defining a pair of spaced-apart converging upper and lower channels therebetween, a wear plate disposed between the upper and lower halves and means securing the upper and lower halves together.

By yet another feature of the invention, the securing means comprises a plurality of tension bolts.

By another feature of the invention, the mounting is specially adapted to provide a square scale wherein four identical such torque-transmitting tubular arms are provided, thereby providing a pair of such mounting means at each corner.

By still another feature of the invention, the mounting is specially adapted to provide a rectangular scale, wherein four such torque-transmitting tubular arms are provided, thereby providing a pair of such mounting means at each corner, one such mounting means at the central portion of each of the longer sides of the rectangular scale frame.

By still a further feature of the invention, the torque-transmitting tubular arms are hollow cylindrical tubes.

(iv) General Description of the Invention

By this invention, generally then, the torque on the torque arm is greatly reduced (sometimes over about 75%) and this significantly reduces its weight, cost of production and assembly. A torque tube (generally cylincrical) is provided in which the distance between the fulcrum and load is reduced as much as 75%, proportionately reducing a given load on the torque tube. For example, where originally a four foot torque tube required a diameter of six inches outside diameter and a three-quarter inch wall, the same weight can be recorded with less deflection with a four foot torque tube, a five and one-half inch outside diameter and a quarter-inch wall.

BRIEF DESCRIPTION OF THE INVENTION

In the accompanying drawings.

Figure 4:
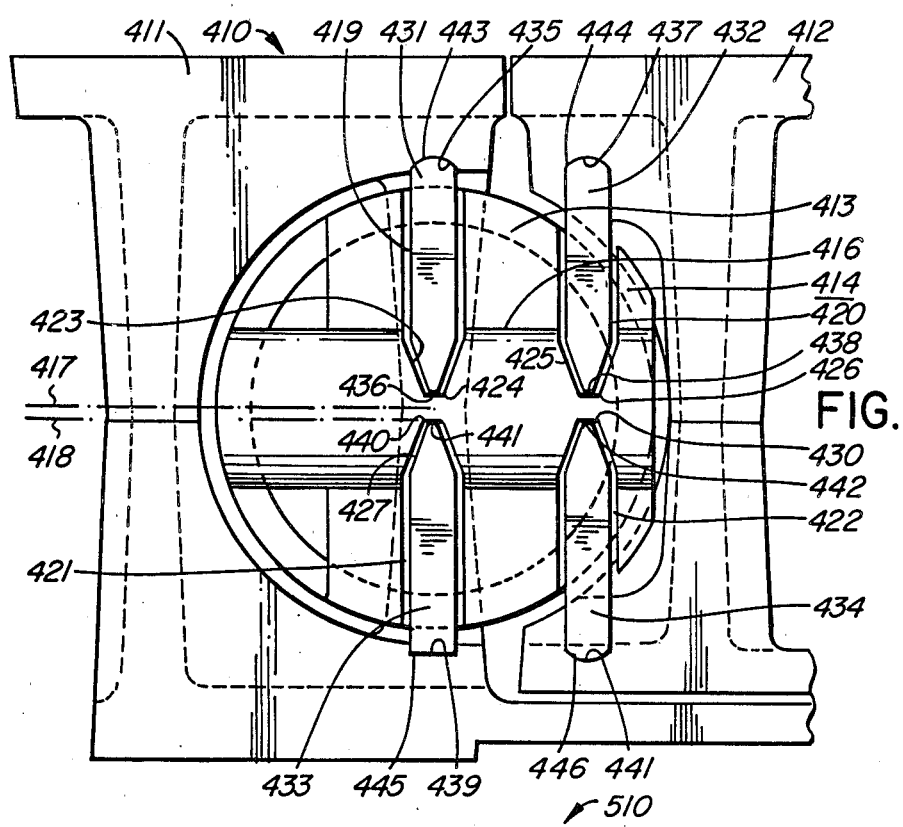
Figure 5:
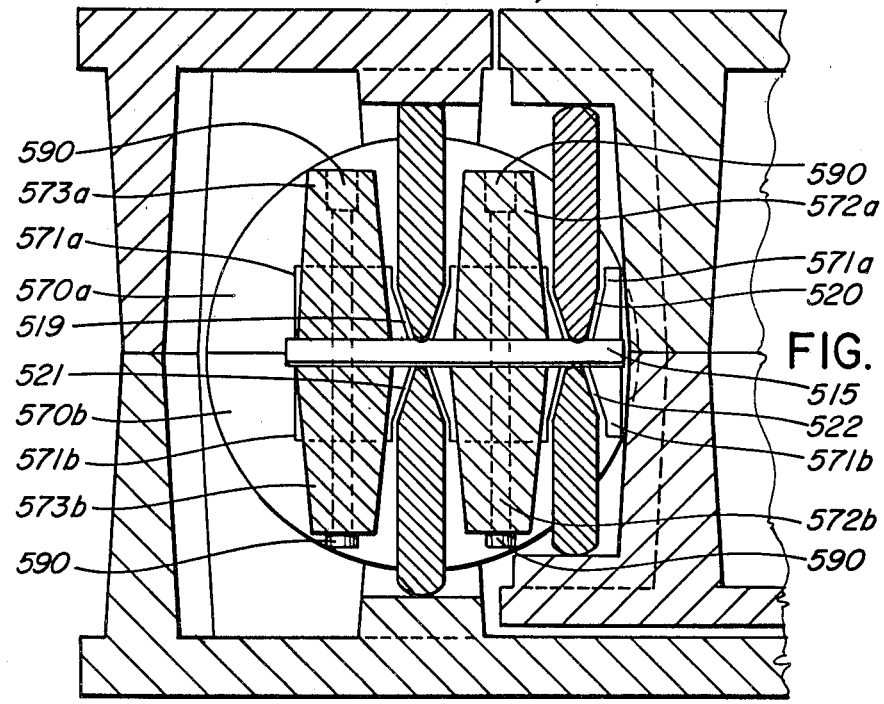

FIG. 4 is a cross section through a corner of a weigh scale of another embodiment of this invention showing the improved mounting of the torque-transmitting tubular arm between the fixed frame and the vertically movable central portion; and FIG. 5 is a cross section through one corner of a weigh scale of yet another embodiment of this invention showing the improved mounting of the torque-transmitting tubular arm between the fixed frame and the movable central platform.

Figure 1:
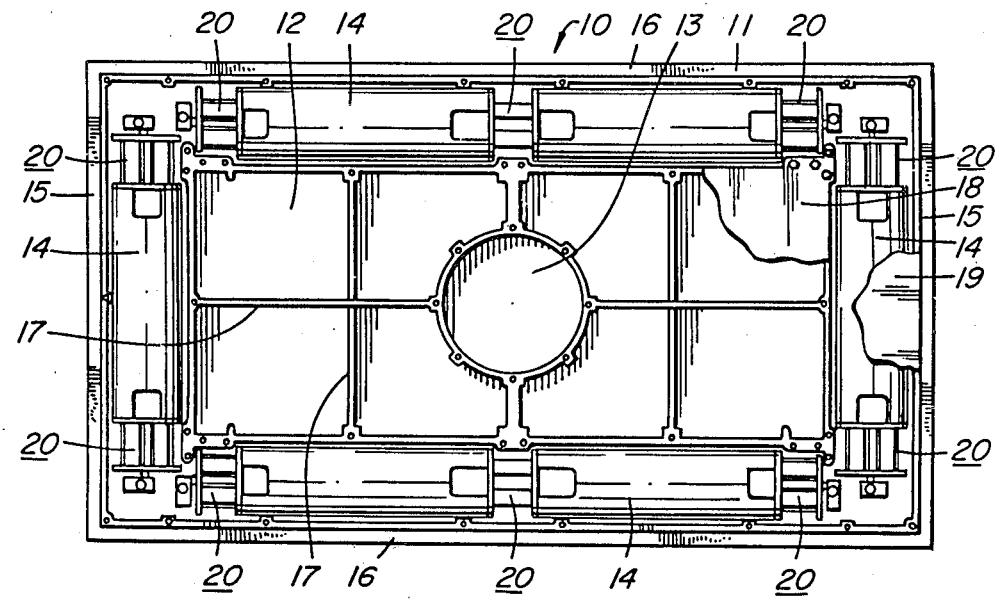
FIG. 1 is a perspective view of the weigh scale of one embodiment of the invention showing the torque-transmitting tubular arms in position within the fixed rectangular frame, the central rectangular load-supporting platform and the central load-measuring device.

DESCRIPTION OF PREFERRED EMBODIMENTS (i) Description of FIG. 1

As seen in FIG. 1, one embodiment is a weigh scale 10 having a fixed peripheral frame 11 and a central movable load-supporting platform 12 provided with a central load-measuring device 13. The peripheral frame 11 provides a nest for four torque-transmitting tubular arms 14, i.e., one at each end 15 and one along each side 16. The torque-transmitting tubular arms along each side 16 are each provided with a central guideway adapted to a single length. Load-supporting platform 12 includes a central framework 17 and a platform 18 secured thereto, as by bolts (not shown). A peripheral cover 19 is secured to the fixed peripheral frame 11, as by bolts (not shown). The torque-transmitting tubular arms 14 are operatively associated to frame 11 and platform 12 by mounting means 20 which will be described in detail hereinafter.

The central load-measuring device may be the one disclosed in U.S. Pat. No. 4,064,955 issued Dec. 27, 1977 to G. Dyck, the contents of which are hereby incorporated by reference. Nevertheless, that load cell may be described in the following terms:

> The hydraulic load cell is disposed between the platform and the base structure. A load on the platform transmits force to the piston of the load cell through a vertically adjustable force transmitting member. The force on the piston increases the pressure in the pressure chamber which is measured by the transducer.

Alternatively, the load cell may be the one described in copending U.S. application Ser. No. 06/128,301, filed Mar. 7, 1980, the contents of which are hereby incorporated by reference. That load-measuring device may be described as follows:

> The load-measuring device operates with low vertical travel and is disposed between the platform and the base structure. The load-measuring device comprises a base; a thin reservoir forming the lower portion of the base; a load-transmitting material in the form of a non-compressible fluid or a soft rubber in the thin reservoir; a flexible diaphragm in direct contact with the load-transmitting material in the reservoir; means for applying a load to the flexible diaphragm; and a transducer including an integral diaphragm at the base thereof held with such integral diaphragm in direct contact with the flexible diaphragm to provide a reading proportional to the value of the load.

In one embodiment of the load cell described in that copending application, also incorporated herein by reference, the load-measuring device includes a base comprised of a lower base portion including a central recess defining a fluid reservoir and an annular rim provided with a plurality of spaced-apart, internally threaded apertures. Typically the recess is as low as about 0.005 inches in depth and is adapted to be filled with a load-transmitting material, e.g., a non-compressible fluid, for example, a hydraulic fluid, oil, or a silicone grease. The load-transmitting material may, alternatively, be a sheet of soft rubber coated on both its flat faces with graphite. The base also includes a flexible diaphragm provided with a plurality of spaced-apart peripheral mounting holes. The flexible diaphragm may be made of any flexible or elastically bendable sheet-like material, e.g., the polytetrafluoroethylene polymer known by the Trademark TEFLON. Holding the diaphragm in place is a mounting ring provided with a plurality of spaced-apart peripheral mounting holes. The mounting ring also serves to define, by its central aperture, the cylindrical chamber. The base is provided with a passage and a spout by which hydraulic fluid is admitted to the reservoir. Then the reservoir is sealed by a screw plug.

Resting in the cylindrical chamber atop the flexible diaphragm is a piston head. The piston head is provided with a central recess and a concentric aperture, as well as with a plurality of spaced-apart internally threaded mounting holes. Disposed within the recess is a transducer, which includes an upper load-transmitting portion, an annular base portion adapted to rest on the floor of the recess, and a centrally axially projecting integral diaphragm portion adapted to project through the aperture and to rest with its integral diaphragm in face-to-face contact with the flexible diaphragm. The transducer is provided with conventional plugs to connect it to a device for converting pressure changes in the reservoir due to load changes to a measure.

While any transducer having an integral diaphragm at its base may be used, one proprietary brand which has been successfully used is the pressure transducer types P725-P727 sold by Schaevitz Engineering, Pennsauken, N.J. This transducer includes four strain gauges which are bonded to a double cantilever beam on a foam-active-arm Wheatstone Bridge configuration. The cantilevers are connected via integral flexures to a force rod which is welded to the force-summing diaphragm, providing good isolation from thermal transients. Of all welded construction, the transducer is manufactured entirely from stainless steel and incorporates transient and high over-pressure protection by means of a positive overload stop.

One manner of holding the above-described assembly in assembled condition is as follows:
firstly, a plurality of L-shaped retaining brackets, one face of which rests atop the upper face of the piston head, the second face of which rests atop the upper face of the ring, with a respective bolt passing through an aperture in the bracket, in the ring, in the diaphragm and tapped holes in the annular lip; and secondly, an L-shaped concentric retaining ring, one face of which rests atop the upper surface of the annular base, the other face of which rests atop the top surface of the piston head, with the upper portion of the transducer embraced by a central aperture, and secured by bolts passing through apertures in the ring and into tapped holes.

Another manner of holding the assembly in place involves the use of washers, e.g., 1/32" thick having a ¾" outside diameter and holes 1/64" in diameter. These are screwed into the upper ring only with 8/32" Allen caps.

In another embodiment of the load cell described in that copending application, which also is incorporated herein by reference,
the load-measuring device includes a base which includes a central recess defining a peripheral lip within which is a cylindrical chamber. The peripheral lip is provided with a plurality of spaced-apart tapped apertures.

The reservoir flexible diaphragm is provided by a disc-shaped hollow sac formed of a suitable flexible plastics material, e.g., P.V.V. A suitable load-transmitting material, e.g., a non-compressible fluid, for example a hydraulic fluid, an oil or a silicone fluid, fills the sac and is sealed therein. The load-transmitting material may alternatively be a thin sheet coated on both of its flat faces with graphite. When the filled sac is placed on the floor of the cylindrical chamber, its upper surface provides a suitable flexible diaphragm.

Resting in the cylindrical chamber atop flexible diaphragm is a piston head. The piston head is provided with a central recess and a concentric aperture, as well as with a plurality of spaced-apart internally threaded mounting holes. Disposed within the recess is a transducer which includes an upper load-transmitting portion, an annular base portion adapted to rest on the floor of the recess, and a centrally axially projecting integral diaphragm portion adapted to project through an aperture and to rest in face-to-face contact with the flexible diaphragm. The transducer is provided with conventional plugs to connect it to a device for converting pressure changes in the sac due to load changes to a measure of weight.

The hydraulic load cell is disposed between the platform and the base structure. A load on the platform transmits force to the piston of the load cell. The force on the piston increases the pressure in the pressure chamber (the thin reservoir) which is measured by the integral diaphragm of the transducer.

Figure 3:
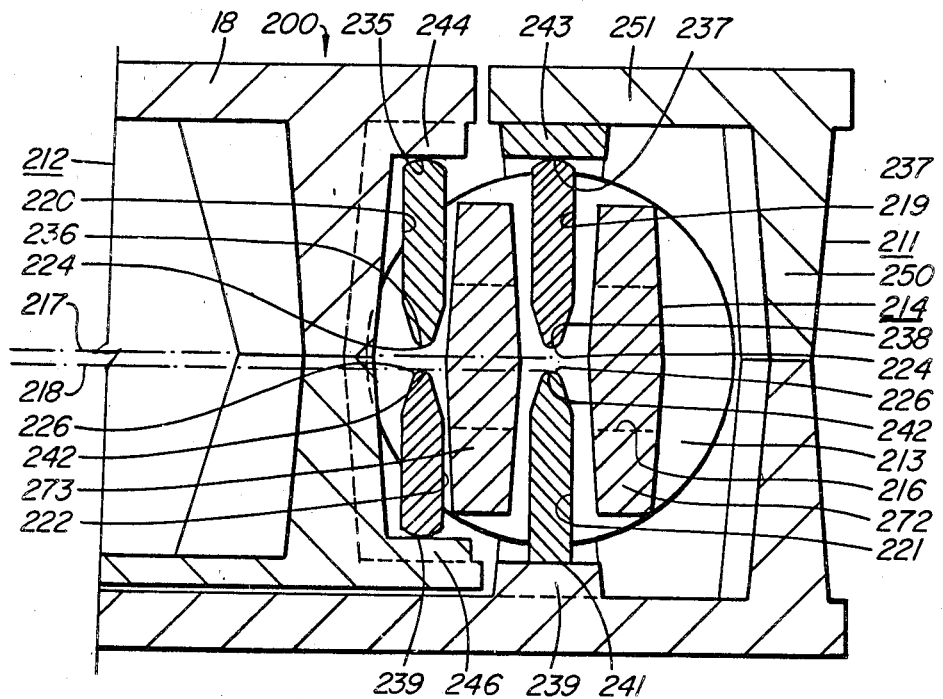
FIG. 3 is a cross section through one corner of the embodiment of FIG. 2.
Figure 2:
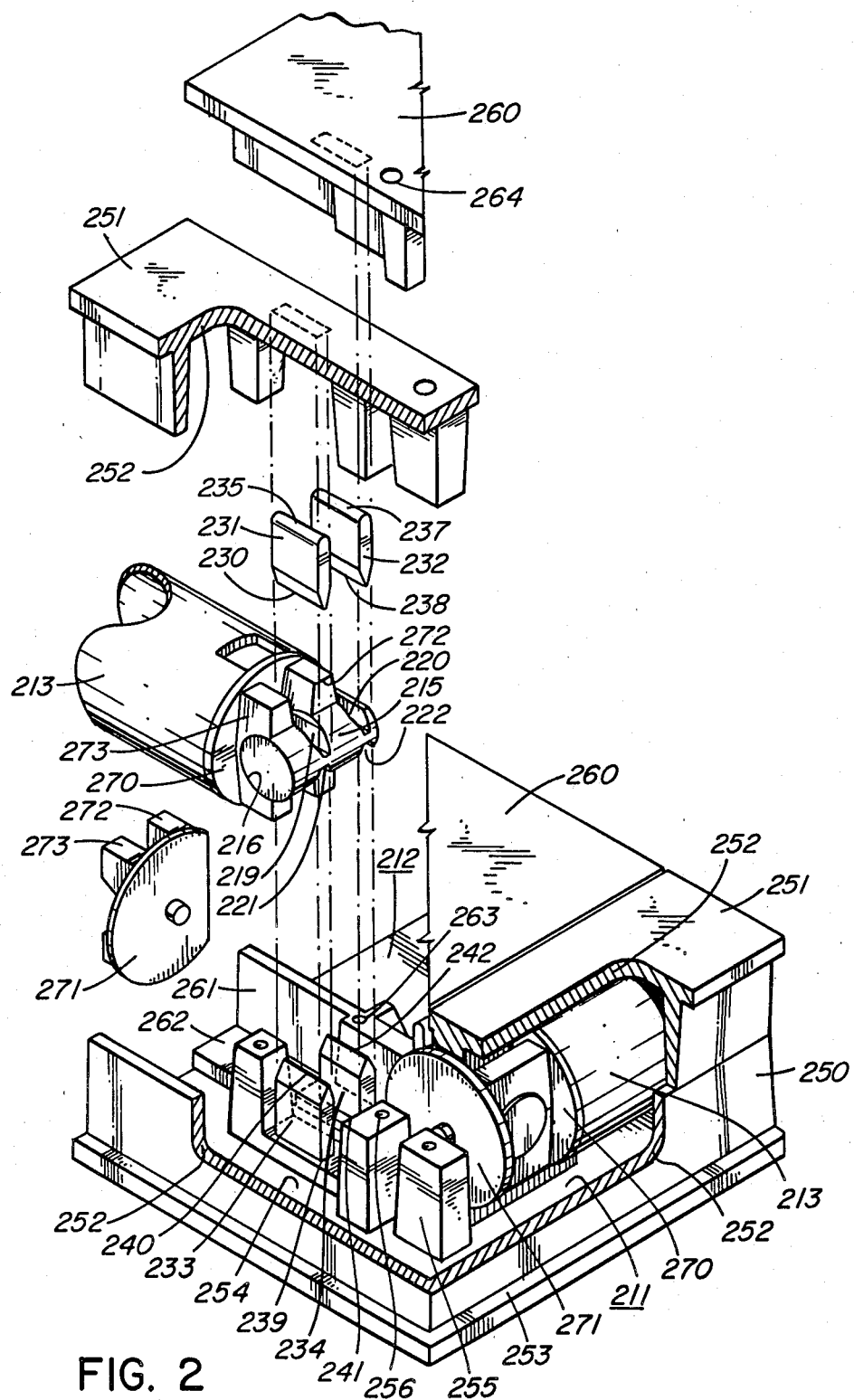
FIG. 2 is an exploded view of one corner of the weigh scale of one embodiment of this invention, showing the mounting means of one embodiment of this invention.

(ii) Description of FIGS. 2 and 3

As seen in FIGS. 2 and 3, the weigh scale 20 includes a fixed peripheral framework 211, a centrally vertically movable platform 212 and four peripherally disposed torque-transmitting tubular arms 213, only two of which are shown. Each torque-transmitting tubular arm 213 is preferably secured at each end thereof by an improved mounting means indicated generally as 214.

The outer peripheral framework 211 includes an outer lower peripheral body 250 and an outer upper peripheral cover 251. The body 250 and the cover 251 are provided with access slots 252 at each corner in order to facilitate assembly and repair. The framework 211 also includes an outer base 253 and an inner base floor 254. The cover 251 is secured to the base floor through pedestals 255 having internally threaded apertures 256 therein, whereby it may be secured by bolts (not shown).

The central movable load-supporting platform 212 is constituted by the platform 260 secured to a lattice grid-like framework 261 integral or secured to a base floor 262 by means of bolts (not shown) engaging internally threaded holes 263 and through ports 264.

The improved mounting means 214 of one embodiment of this invention includes a pair of spaced-apart discs 270, 271, one of which (270) is secured to the end of hollow cylindrical tubular arm 213. Between discs 270, 271 are a pair of upright spaced-apart bars 272, 273 disposed along chords of the end of the arm 213, and secured to mutually opposed faces of discs 270, 271. A transverse securing pin 215 is secured within an associated transverse bore 216 in the bars 272, 273, as by heat shrinking. The plane 217 of the central longitudinal axis of the securing pin 215 is offset from the plane 218 of the central longitudinal axis of the torque-transmitting tubular arm 213 by an amount of, e.g., about 0.125", in order to provide for torsional rotation of the torque-transmitting tubular arm 213.

The securing pin 215 is provided with an upper, outer guideway 219 and an upper, inner guideway 220, as well as with a lower outer guideway 221 and a lower inner guideway 222. The upper guideways 219, 220 taper downwardly to a flat support surface 224, and the lower guideways 221, 222 taper upwardly to a flat support surface 226.

Four support shoes are provided, namely upper outer support shoe 231, upper inner support shoe 232, lower outer support shoe 233, and lower inner support shoe 234. Upper outer support shoe 231 includes broad upper curved support surface 235 and a tapering lower end terminating in a narrow lower curved support surface 236; upper inner support shoe 232 includes a broad upper curved support surface 237 and a tapering lower end terminating in a narrow lower curved support surface 238; lower outer support shoe 233 includes a broad flat lower support surface 239 and a tapering upper end terminating in a narrow upper support curved surface 240; and lower inner support shoe 234 includes a broad, rounded, lower support surface 241 and a tapering upper end terminating in a narrow upper curved surface 242.

The support shoes are disposed as follows: upper outer support shoe 231 is disposed in guideway 219 so that surface 236 rests on wear surface 224, and rounded surface 235 is pivotal with respect to seat 243 on the inner face of cover 251; support shoe 232 is disposed in guideway 220 so that surface 238 rests on wear surface 226, and rounded surface 237 is pivotal with respect to seat 244 on the inner face of platform 260; support shoe 233 is disposed in guideway 221 so that surface 240 is supported on wear surface 228, and flat surface 239 is secured on wear plate 239; and support shoe 234 is disposed in guideway 222 so that surface 242 is supported on wear surface 230, and surface 241 is pivoted on with respect to wear plate 246.

(iii) Description of Operation of Embodiments of FIGS. 2 and 3

Thus, in operation, downward movement of platform 212 is resisted by shoes 232, 234, which cause torsional rotation of torque-transmitting tubular arm 213 through shoes 231, 233. The curved seated surfaces 235, 243 allow a slight rotation of the shoes similar to the roller supports disclosed in the above-noted Dyck United States Patent. The slight downward movement of the central platform 212 is sensed by the load-measuring device and the transducer provides a signal proportional to the weight, as previously disclosed.

(iv) Generalized Description of FIG. 3

While this embodiment (FIG. 3) shows the broad end of the upper outer shoe to be curved and pivotally disposed with respect to the upper wear plate, and the broad end of the lower outer shoe to be flat and secured to the lower wear plate, the reverse embodiment may also be used. In other words, the broad end of the upper outer shoe may be flat and be secured to the upper wear plate, while the lower outer shoe may be curved and pivotally disposed with respect to the lower wear plate. The inner narrow ends of the upper outer shoe and the lower outer shoe are rounded and pivotally disposed with respect to their respective wear surfaces. In all instances, however, both the upper broad end and the lower narrow end of the upper inner shoe and the lower inner shoe are rounded and pivotally disposed with respect to their respective wear surfaces or plates.

The curvature at each end (where provided) is defined by the following formula $r = h/2$, where r is the radium of curvature and h is the height of the shoe.

(v) Description of FIG. 4

As seen in FIG. 4, the weigh scale 410 includes a fixed peripheral framework 411, a centrally vertically movable platform 412, and four peripherally disposed torque-transmitting tubular arms 413, only one of which is preferably secured at each end thereof, by an improved mounting means indicated generally as 414.

Each mounting means 414 of this embodiment of the invention includes a transverse securing pin 415 secured within an associated transverse bore 416 in the torque-transmitting tubular arm 413, as by heat shrinking. The plane 417 of the central longitudinal axis of the securing pin 415 is offset from the plane 418 of the central longitudinal axis of the torque-transmitting tubular arm 413 by an amount of, e.g., about 0.125", in order to provide for torsional rotation of the torque-transmitting tubular arm 413.

The torque-transmitting tubular arm 414 is provided with an upper, outer guideway 419 and an upper, inner guideway 420, as well as with a lower outer guideway 421 and a lower, inner guideway 422. The securing pin 415 is provided with an upper, outer guideway extension 423, coextensive with guideway extension 419 tapering downwardly to a flat support surface 424, and an upper, inner guideway extension 425, coextensive with guideway 420, guideway extension 425 tapering downwardly to a flat support surface 426. Similarly, the securing pin 415 is provided with a lower, outer guideway extension 427, coextensive with guideway 421, tapering upwardly to a flat support surface 440, and a similar lower, inner guideway 422 tapering upwardly to a flat support surface 430.

Four support shoes are provided, namely, upper outer support shoe 431, upper inner support shoe 432, lower outer support shoe 433, and lower inner support shoe 434. Upper outer support shoe 431 includes broad upper curved surface 435 constituting an arc of a support roller and a narrow lower curved support surface 436; upper inner support shoe 432 includes a broad upper curved support surface 437 constituting an arc of a support roller and a narrow lower curved support surface 438; lower outer support shoe 433 includes a broad lower flat support surface 439 and a narrow upper curved support surface 441; and lower inner support shoe 434 includes a broad lower curved support surface 441 and a narrow upper curved support surface 442.

The support shoes are disposed as follows: upper outer support shoe 431 is disposed in guideway 419 so that curved surface 436 rests on surface 424, and surface 435 is pivotally seated in curved seat 443; support shoe 432 is disposed in guideway 420 so that curved surface 438 rests on surface 426, and curved surface 437 is pivotally seated in seat 444; support shoe 433 is disposed in guideway 421 so that curved surface 440 is supported on surface 428, and flat surface 439 is fixedly seated in grooved seat 445; and support shoe 434 is disposed in guideway 422, so that curved surface 442 is supported on surface 430, and curved surface 441 is pivotally seated in seat 446.

(vi) Operation of Embodiment of FIG. 4

Thus, in operation, downward movement of platform 412 is resisted by shoes 432, 434, which causes torsional rotation of torque-transmitting tubular arm 413 through shoes 431, 433. The curved seated surfaces 435, 437 allow a slight rotation, similar to the roller supports disclosed in the above-noted Dyck United States Patent.

(vii) Generalized Description of FIG. 4

While this embodiment (FIG. 4) shows the broad end of the upper outer shoe to be curved and pivotally disposed with respect to the upper wear plate, and the broad end of the lower outer shoe to be flat and secured to the lower wear plate, the reverse embodiment may also be used. In other words, the broad end of the upper outer shoe may be flat and be secured to the upper wear plate, while the lower outer shoe may be curved and pivotally disposed with respect to the lower wear plate. The inner narrow ends of the upper outer shoe and the lower outer shoe are rounded and pivotally disposed with respect to their respective wear surfaces. In all instances, however, both the upper broad end and the lower narrow end of the upper inner shoe and the lower inner shoe are rounded and pivotally disposed with respect to their respective wear surfaces or plates.

The curvature at each end (where provided) is defined by the following formula $r=h/2$, where r is the radius of curvature and h is the height of the shoe.

(viii) Description of FIG. 5

The embodiment of the weigh scale 510 shown in FIG. 5 differs from the other embodiments in its simplicity. Instead of having the transverse securing pin 215, 415 this embodiment provides a flat plate 515 as a wear surface between upper guideways 519, 520 and lower guideways 521, 522, which themselves are formed in upper horizontal bar 571a and lower horizontal bar 571b in identical mirror-image upper and lower halves. Semi-circular discs, namely upper semi-circular discs 570a and lower semi-circular discs 570b are secured to the end of torque-transmitting tubular arm 513 and to spaced-apart upright bars 572a, 573a, 572b, 573b. After the plate 515 is disposed therebetween, the identical upper and lower halves are secured together by tension bolts 590.

(ix) Description of Operation of Embodiment of FIG. 5

The disposition and operation of the support shoes are the same in this embodiment as in the previous embodiments.

(x) Generalized Description of FIG. 5

While this embodiment (FIG. 5) shows the broad end of the upper outer shoe to be curved and pivotally disposed with respect to the upper wear plate, and the broad end of the lower outer shoe to be flat and secured to the lower wear plate, the reverse embodiment may also be used. In other words, the broad end of the upper outer shoe may be flat and be secured to the upper wear plate, while the lower outer shoe may be curved and pivotally disposed with respect to the lower wear plate. The inner narrow ends of the upper outer shoe and the lower outer shoe are rounded and pivotally disposed with respect to their respective wear surfaces. In all instances, however, both the upper broad end and the lower narrow end of the upper inner shoe and the lower inner shoe are rounded and pivotally disposed with respect to their respective wear surfaces or plates.

The curvature at each end (where provided) is defined by the following formula $r=h/2$, where r is the radius of curvature and h is the height of the shoe.

The torque-transmitting tubular arms may be of any crosssectional shape, i.e., square, rectangular, oval, round, etc. However, it is preferred that the torque-transmitting tubular arms be hollow cylinders.

GENERALIZED DESCRIPTION

The arrangement of the torque-transmitting tubular arms and the support shoe assemblies provides that the platform remains horizontal with minimal deflection when a load is applied at any point on the platform. Because the vertical motion is supported totally on the load cell, the limitation of vertical motion of the torque tubes thus has no bearing on the performance of the scale.

The platform thus moves in vertical motion with high precision and rigidity. The use of the support shoes provides low friction or resistance to vertical travel of the platform providing high sensitivity over a wide range of loads. The high degree of rigidity and low friction makes it possible to use a single centrally located load cell. At the same time, a single load cell reduces the complexity of the apparatus.

The load cell as previously described is disposed between the platform and the base structure. As previously described, a load on the platform transmits force to the piston of the load cell through a vertically adjustable force-transmitting member. The force on the piston increases the pressure in the pressure chamber which is measured by the transducer.

In order to achieve the lowest possible response time, the vertical travel of the load cell should be as small as possible. Vertical travel of the piston, and hence platform, can be decreased by increasing the area of the piston. Reduced vertical travel of the piston allows the use of the flat diaphragm which minimizes elasticity, a cause of excess vertical travel. Decreased vertical travel of the piston allows a reduction of depth of the pressure chamber which minimizes temperature effects.

The very low vertical travel makes it possible to cover and/or to seal the weighing scale of this invention for protection. For example, the entire structure may be enclosed, utilizing a flexible sheet material on the top surface, thereby substantially preventing contamination by dust, moisture, etc., and confining a lubricant for the pad and roller assemblies. Also, the weighing scale may be covered by a flexible rod surface material, e.g., asphalt, making it possible to place the scale inconspicuously on a highway.

If it is desired to use the weighing scale of this invention for weighing vehicles at higher speeds, the smoothings of the highway portion leading to the weighing scale becomes more important since any irregularities cause transient perturbations in the vehicle suspension. An effective method of achieving smoothness is to resurface the highway for a distance of about 200 feet leading to the scale, over the scale itself and for about 50 feet beyond the scale with a continuous mat of asphalt about 1 inch thick.

GENERALIZED DESCRIPTION OF OPERATION OF THE INVENTION

In operation, the vehicle to be weighed, e.g., a truck, passes over the weigh scale and applies a load force to the piston. The transducer, which is mounted flush to the bottom of the piston, instantly senses the change in hydraulic pressure and measures the load through the flexible diaphragm or through the sealed pressure sac which is in face-to-face contact with the integral diaphragm of the transducer. This pressure change is converted to a direct measure of weight of the article.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. In a weigh scale including a fixed peripheral frame base structure, a central, movable load-supporting platform, and means for interconnecting said platform with said peripheral frame base structure to allow limited vertical motion of the platform, the interconnecting means comprising at least four torque-transmitting tubular arms arranged evenly around the perimeter of said load-supporting platform, with one portion of each said torque-transmitting tubular arm being supported with respect to said fixed peripheral frame base structure, and another portion of each said torque-transmitting tubular arm being supported with respect to the central load-supporting platform, the improved mounting for said torque-transmitting tubular arm comprising:
 (a) a pair of vertically-disposed, spaced-apart, inner and outer guideways, extending along spaced-apart chords of the end of each said torque-transmitting tubular arm;
 (b) a horizontally-extending, hardened wear surface intersecting said guideways, thereby providing an inner upper, an inner lower, an outer upper and an outer lower guideway; and
 (c) an inner upper, an inner lower, an outer upper and an outer lower support shoe operatively associated with a respective inner upper, inner lower, outer upper and outer lower guideway, each of said inner upper and inner lower support shoes having a broad arcuate support surface and a narrow arcuate support surface, with the narrow arcuate support surface of each said support shoe bearing against the hardened wear surface, and with the broad arcuate support surface of each such support shoe bearing against respective upper and lower surface of an associated movable central load-supporting platform, each said upper outer support shoe and said lower outer support shoe having a narrow arcuate support surface, with such narrow arcuate support surface of each such support shoe bearing against the hardened wear surface, and either the outer upper support shoe or the outer lower support shoe having a broad flat support surface, the other of the outer upper support shoe or the outer lower support shoe having a broad arcuate support surface, and with the broad support surfaces of each outer support shoe bearing against respective upper and lower surfaces of associated fixed peripheral frame base structure.

2. The improved mounting of claim 1 wherein said broad arcuate support surface of each said upper inner support shoe has such arcuately curved surface adapted pivotally to support lower faces of upper portions of said movable central load-supporting platform, and wherein said broad arcuate support surface of each said lower inner support shoe has an arcuately curved surface adapted pivotally to support upper faces of lower portions of said movable central load-supporting platform.

3. The improved mounting of claim 1 to provide a square scale wherein four identical such torque-transmitting tubular arms are provided, thereby providing a pair of such mounting means at each corner.

4. The improved mounting of claim 1 to provide a rectangular scale, wherein four such torque-transmitting tubular arms are provided, thereby providing a pair of such mounting means at each corner, and one such mounting means at the central portion of each of the longer sides of said rectangular scale frame.

5. The improved mounting of claim 1 wherein said torque-transmitting arms are hollow cylindrical tubes.

6. The improved mounting of claim 1 wherein said narrow arcuate support surface of each said support shoe has an arc defined by the equation $$r = h/2$$

where r is the radius of the arc
and h is the height of the shoe.

7. The improved mounting of claim 6 wherein each said narrow arcuate support surface is defined by a pair of converging side walls terminating in said arcuate surface.

8. The improved mounting of claim 1 wherein said broad arcuate support surface of each said upper inner support shoe has such arcuately curved surface adapted pivotally to support lower faces of upper portions of said movable central load-supporting platform.

9. The improved mounting of claim 8 wherein said broad arcuate support surface of each said upper inner support shoe is disposed within an arcuate channel inset into a lower face of an upper portion of said movable central load-supporting platform.

10. The improved mounting of claim 1 wherein said broad arcuate support surface of each said lower inner support shoe has an arcuately curved surface adapted pivotally to support upper faces of lower portions of said movable central load-supporting platform.

11. The improved mounting of claim 10 wherein said broad arcuate surface of each said lower inner support shoe is disposed within an arcuate channel inset into an upper face of a lower portion of said movable load-supporting platform.

12. The improved mounting of claim 1 wherein said guideways and said wear surface are provided by a horizontally-extending diametrical rod secured to one end of a torque-transmitting tubular arm, said rod being provided with a pair of spaced-apart, converging upper and lower channels, each terminating in a flat wear surface, said channels being vertically separated by such wear surface.

13. The improved mounting of claim 12 wherein the central longitudinal axis of said rod is offset about 0.125" below the central longitudinal axis of said torque-transmitting tubular arm.

14. The improved mounting of claim 1 wherein said guideways and said wear surface are provided by upper and lower halves defined by a pair of spaced-apart upper and lower vertically disposed bars defining a pair of spaced-apart, converging upper and lower channels therebetween, a wear plate disposed between the upper and lower halves and means securing said upper and lower halves together.

15. The improved mounting of claim 14 wherein said securing means comprises a plurality of tension bolts.

16. The improved mounting of claim 1 wherein said broad support surface of said inner upper support shoe has an arcuately curved surface, and wherein said broad support surface of said inner lower support shoe has a flat surface.

17. The improved mounting of claim 16 wherein said broad arcuate support surface of said inner upper support shoe has an arcuately curved surface adapted pivotally to support lower faces of upper portions of said fixed peripheral frame base structure.

18. The improved mounting of claim 16 wherein said broad flat support surface of said inner lower support shoe is fixed within a channel inset into an upper face of a lower portion of said fixed peripheral frame base structure.

19. The improved mounting of claim 1 wherein said broad support surface of said inner upper support shoe has a flat surface, and wherein said broad support surface of said inner lower support shoe has an arcuately curved surface.

20. The improved mounting of claim 10 wherein said broad arcuate support surface of said inner lower support shoe has an arcuately curved surface adapted pivotally to support upper faces of a lower portion of said fixed peripheral frame base structure.

21. The improved mounting of claim 19 wherein said broad flat support surface of said inner upper support shoe is fixed within a channel inset into a lower face of an upper portion of said fixed peripheral frame base structure.

22. A weigh scale comprising in combination:
(a) a fixed rectangular peripheral frame base structure;
(b) a central movable rectangular load-supporting platform;
and (c) means for interconnecting said platform with said peripheral frame base structure to allow limited vertical motion of said platform, the interconnecting means comprising at least four torque-transmitting tubular arms arranged evenly around the perimeter of said load-supporting platform, with one portion of each said torque-transmitting tubular arm being supported with respect to said fixed peripheral frame base structure, and another portion of each said torque-transmitting tubular arm being supported with respect to said central load-supporting platform, said mounting for each said torque-transmitting tubular arm comprising:
(1) a pair of vertically-disposed, spaced-apart, inner and outer guideways, extending along spaced-apart chords of the end of each said torque-transmitting tubular arm;
(2) a horizontally-extending, hardened wear surface intersecting said guideways, thereby providing an inner upper, an inner lower, an outer upper and an outer lower guideway;
(3) an inner upper, an inner lower, an outer upper and an outer lower support shoe operatively associated with a respective inner upper, inner lower, outer upper and outer lower guideway, each of said inner upper and inner lower support shoes having a broad arcuate support surface and a narrow arcuate support surface, with the narrow arcuate support surface of each such support shoe bearing against the hardened wear surface, and with the broad arcuate support surface of each such support shoe bearing against respective upper and lower surface of an associated movable central load-supporting platform, each said upper outer support shoe and said lower outer support shoe having a narrow arcuate support surface, with such narrow arcuate support surface of each such support shoe bearing against the hardened wear surface, and either the outer upper support shoe or the outer lower support shoe having a broad flat support surface, the other of the outer upper support shoe or the out outer lower support shoe having a broad arcuate support surface, and with the broad support surfaces of each outer support shoe bearing against respective upper and lower surfaces of associated fixed peripheral frame base structure; and
(4) a load-measuring device operating with low vertical travel disposed between the platform and the base structure, said load-measuring device comprising: a sealed flat chamber, filled with load-transmitting material in the form of a non-compressible fluid or soft rubber, the lower portion thereof comprising a base, the upper portion thereof comprising a flat diaphragm, said load-measuring device including a transducer having an integral diaphragm surface thereof maintained in face-to-face contact with said flat diaphragm, said transducer being adapted to measure the increase in presssure applied to the diaphragm, thereby to provide a measure of the weight.

* * * * *